(12) United States Patent
Wirz

(10) Patent No.: US 7,712,219 B2
(45) Date of Patent: May 11, 2010

(54) PROCESS FOR THE ALIGNING OF TOOTH SPACES OF A WORKPIECE WITH PRECUT TEETH

(75) Inventor: Walter Wirz, Pfaffikon (CH)

(73) Assignee: Reishauer AG, Wallisellen (CH)

( * ) Notice: Subject to any disclaimer, the term of this patent is extended or adjusted under 35 U.S.C. 154(b) by 928 days.

(21) Appl. No.: 11/050,750

(22) Filed: Feb. 7, 2005

(65) Prior Publication Data

US 2005/0186886 A1    Aug. 25, 2005

(30) Foreign Application Priority Data

Feb. 24, 2004   (DE) .................. 10 2004 009 393

(51) Int. Cl.
    *B21K 1/30*    (2006.01)
(52) U.S. Cl. ..................... 29/893.31; 29/893; 29/893.2; 29/893.3; 73/162
(58) Field of Classification Search ........ 29/893–893.3, 29/893.31, 893.35; 73/162; 33/501.09
    See application file for complete search history.

(56) References Cited

U.S. PATENT DOCUMENTS

| 2,326,368 | A | | 8/1943 | Kullman et al. |
| 3,851,398 | A | * | 12/1974 | Hilburger ................ 33/501.09 |
| 4,550,508 | A | * | 11/1985 | Spaeth ................... 33/501.19 |
| 5,174,070 | A | | 12/1992 | Loesch |
| 5,271,271 | A | | 12/1993 | Frazier |
| 5,513,442 | A | | 5/1996 | Flair |

FOREIGN PATENT DOCUMENTS

| DE | 41 19 871 C1 | 5/1992 |
| DE | 195 19 429 C1 | 10/1996 |
| DE | 195 81 912 C1 | 1/1998 |
| EP | 0 744 607 B1 | 11/1996 |

* cited by examiner

*Primary Examiner*—Rick K Chang
(74) *Attorney, Agent, or Firm*—Browdy and Neimark, PPLC

(57) ABSTRACT

In a process for the aligning of the tooth spaces of a workpiece with precut teeth, which is set up on the work spindle of a gear finishing machine, the workpiece (1) is brought into no-backlash double flank mesh with a pilot gear (6). The workpiece (1) is rotated, and during this rotation both the angular position of the tooth space centre lines of the pilot gear (6) and the centre distance between the pilot gear (6) and the workpiece (1) are measured. This allows the workpiece (1) to be tested with respect to radial run-out, flank material allowance, helix angle, and any possible irregularities.

4 Claims, 4 Drawing Sheets

PROCESS FOR THE ALIGNING OF TOOTH SPACES OF A WORKPIECE WITH PRECUT TEETH

FIELD OF THE INVENTION

The present invention concerns a process for the aligning of tooth spaces of a pre-machined workpiece.

The invention applies particularly to the aligning of the tooth spaces of pre-machined workpieces relative to a machining tool, the workpieces being set up on the work spindle of a gear finishing machine for the purpose of fine machining combined with the testing of those workpiece properties prior to the machining operation which are significant for the reliability of the process.

BACKGROUND OF THE INVENTION

Increased demands on the running qualities of gears in gear drives require more and more the precision finish machining of the gear teeth. In most cases the pre-machined workpieces are case-hardened, and then fine machined to the finished dimensions on all their functional surfaces. In this process the fine machining of the tooth flanks in particular is a complicated, resource consuming, and hence expensive operation. In the interests of economic manufacture, but also in order to avoid having to provide for unnecessarily large hardening depths and to balance and minimize the wear on the left and right flanks of the fine machining tool, it is therefore attempted to keep the material allowance for the fine machining as small as possible. For the fine machining of the teeth this means in practice that the depth of cut per flank for material removal is only a few hundredths to at most two tenths of a millimeter. If, as is generally the case, the left and right flanks are machined in the same operation, this demands a very accurate aligning of the precut teeth relative to the fine machining tool, so that the latter can be brought exactly into the centre of the tooth spaces to be machined, in order to achieve uniform material removal from the left and right flanks of the workpiece.

In the aligning process most frequently encountered in practice on gear finishing machines, a non-contact functioning measuring probe—the aligning probe—is located at a geometrically suitable point in the working area of the machine, near the outer diameter of the precut teeth of the workpiece set up on the work spindle, the said probe operating on an inductive, optical or magnetic principle. By rotating the work spindle, the angular positions of all the tooth flanks are measured, and an average value of the tooth space centre lines calculated. This is compared with the desired value stored in the machine control system, and brought to coincide with the latter by rotating the work spindle. As well as the aligning itself, the measuring action described simultaneously permits the gear blank to be tested with respect to the presence of the tooth spaces and the specified number of teeth.

Experience in industrial gear manufacture has led to the conclusion that alongside the number of teeth and the presence of pre-machined teeth prior to the machining operation intended, additional properties of the gear blank should be tested in order to guarantee the process reliability demanded. These include the radial run-out state of the pre-cut teeth, the tooth flank machining allowance, the helix angle, and any possible irregularities in the pre-machining operation across the whole workpiece facewidth on all the teeth. These properties cannot be detected with hitherto known aligning devices. Their inspection therefore requires either a previous measurement on a separate suitable measuring device in an additional operation, or additional measuring devices in the working area of the machine, which are difficult to accommodate due to the space limitations, and which increase costs.

SUMMARY OF THE INVENTION

It is an object of the present invention to provide a process for the aligning of the tooth spaces of a pre-machined workpiece, by and with which the workpiece can be tested not only with respect to the correctness of the number of teeth it contains, but without substantially greater expense also with respect to the observation of quality demands such as for example radial run-out quality, helix angle and machining allowance, as well as the presence of irregularities in the pre-machining process.

According to the invention, the workpiece and a pilot gear of like diametral pitch (i.e. of like module) are brought into double flank no-backlash mesh, and during the rotation of the workpiece both the angular positions of the pilot gear tooth flanks and the centre distance between the pilot gear and the workpiece are measured.

Further advantageous forms of embodiment are indicated in the pertinent claims.

BRIEF DESCRIPTION OF THE DRAWINGS

In the following the invention is explained in detail by way of preferred embodiments which are illustrated in the annexed drawings. The drawings depict.

DETAILED DESCRIPTION OF PREFERRED EMBODIMENTS

Figure 1:
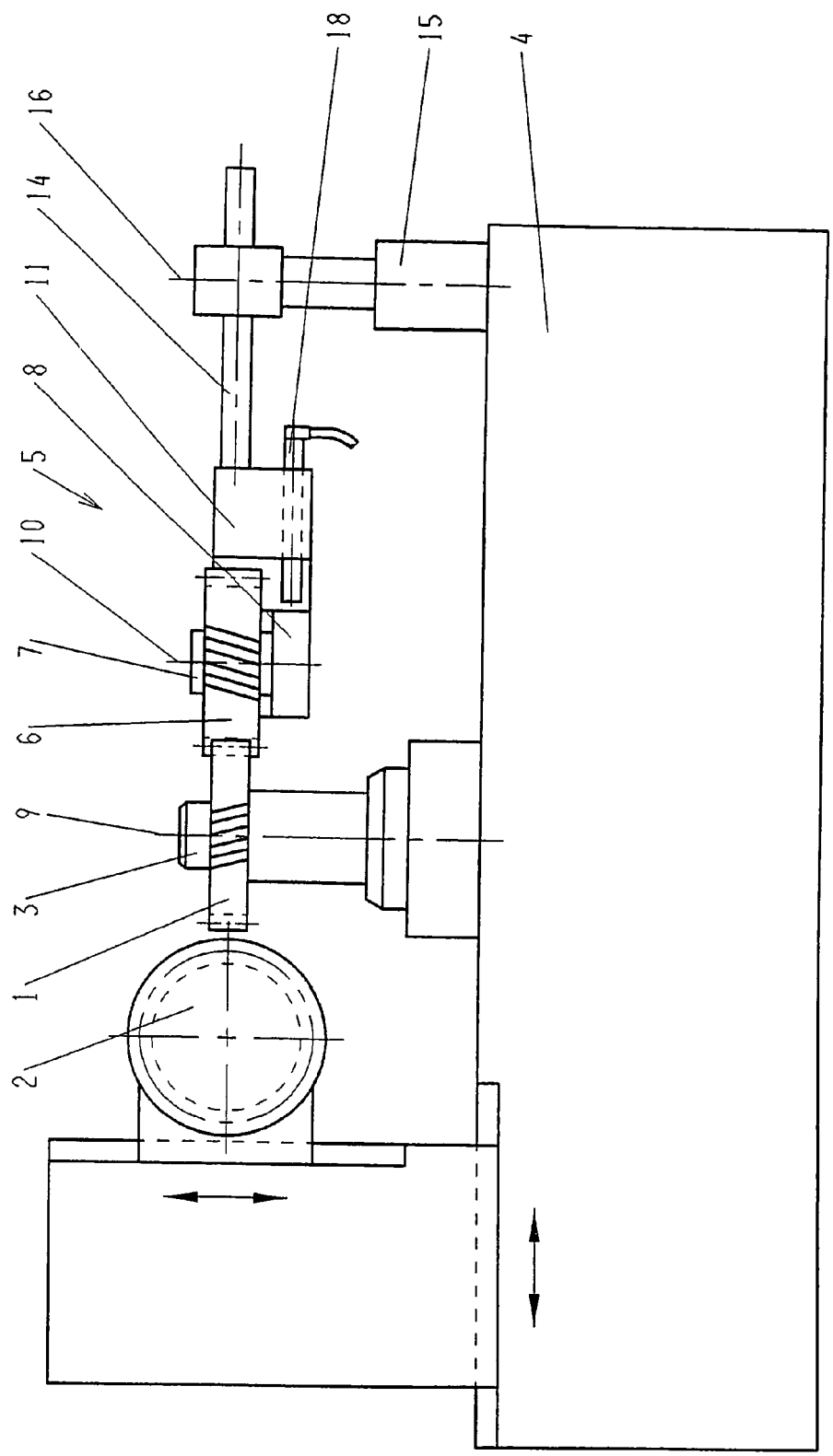
FIG. 1 A diagrammatic representation of a gear finishing machine in a first form of embodiment.

FIG. 1 depicts a diagrammatic front elevation of a machine for the finish machining of the tooth flanks of a gear blank, in particular of a workpiece 1 with pre-cut teeth by means of a tool 2 arranged for radial and axial displacement relative to the said workpiece 1. The workpiece 2 is for example a grinding worm.

The machine is provided with a work spindle 3 which is located for rotation in a machine bed 4. The workpiece 1 can be clamped to the work spindle 3.

The machine is also equipped with an aligning and testing device 5, by means of which the workpiece 1 can be aligned and tested prior to further machining. According to the invention this aligning and testing device 5 incorporates a pilot gear 6, which has the same module as the workpiece 1 but a helix angle of opposite hand.

FIG. 1 depicts a measuring position in which the workpiece 1 and the pilot gear 6 are in no-backlash double flank mesh.

The pilot gear 6 is set up on a pilot gear spindle 7. This pilot gear spindle 7 is preferably located in a pilot gear support 8 for rotation about a pilot gear axis 10 parallel to the work spindle axis 9.

The pilot gear support 8 is swivel-connected to a bearer arm 11 via a pilot gear support axis 12, likewise parallel to the work spindle axis 9. The bearer arm 11 is located on a clamping shaft 14, and thus connected to a pivot spindle 15 in adjustable, locked position. The pivot spindle 15 is located in the machine bed 4 for rotation about a pivot axis 16 preferably parallel to the work spindle axis, and is axially displaceable and lockable. A compression spring 13 between the pilot gear support 8 and the bearer arm 11 assures that with the aligning and testing device 5 in measuring position the workpiece 1 and pilot gear 6 are in no-backlash, double flank mesh.

Figure 3:
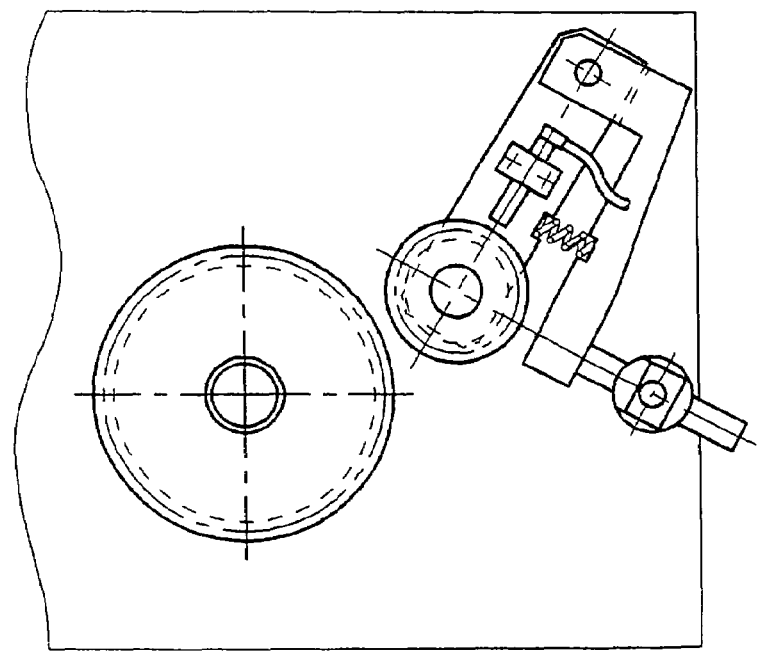
FIG. 3 The machine represented in FIG. 1 in a second partial plan view.

FIG. 3 shows the aligning and testing device 5 in its position of rest after swivelling clear of the measuring position. Various other media for the advance and retraction of the aligning and testing device 5 are quite feasible.

Figure 2:
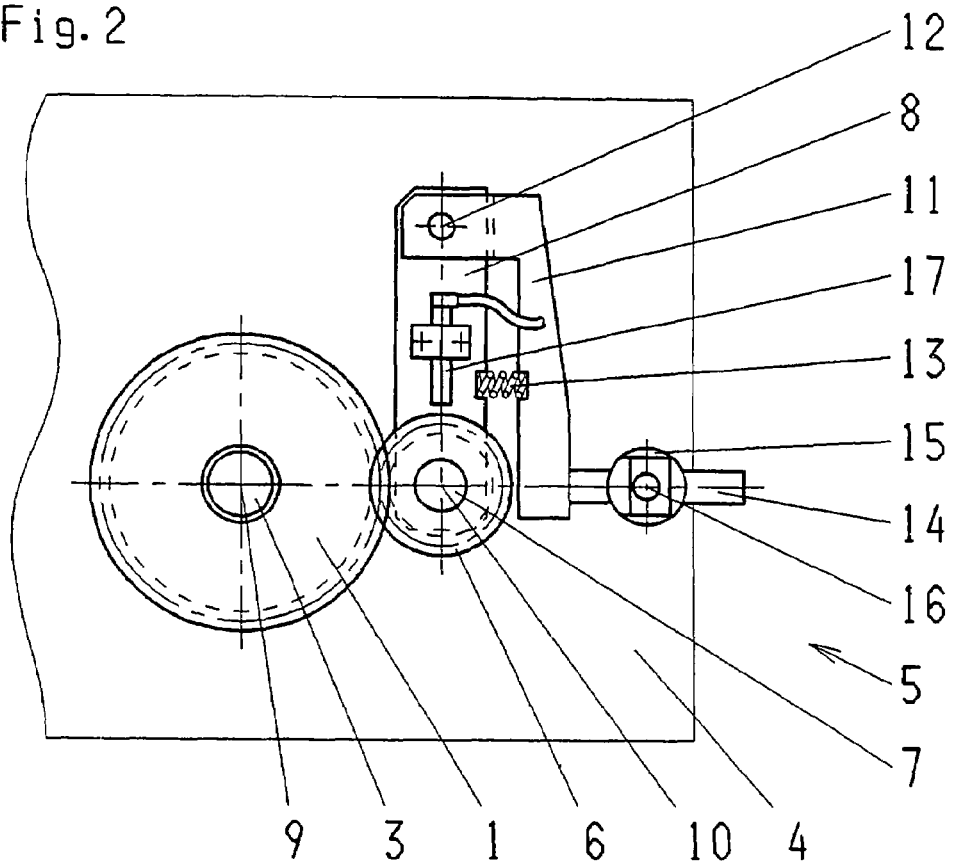
FIG. 2 The machine represented in FIG. 1 in a first partial plan view.

After swivelling the aligning and testing device 5 into the measuring position according to FIG. 2, the workpiece 1 rotates continuously, and the angular position of the pilot gear tooth flanks are measured in known fashion by means of an aligning probe 17 connected firmly to the pilot gear support 8. The advantage over the usual measurement on the workpiece flanks lies in the comparatively high surface quality and uniformity of the ground pilot gear tooth flanks, by which a more accurate measurement is possible. Simultaneously, by means of a measuring probe 18 firmly connected to the bearer arm 11, the centre distance between the work spindle axis 9 and the pilot gear axis 10 is measured. The magnitude and time basis variation of this dimension during one workpiece revolution give information on the quality of the pre-machining of the teeth, and on the deviation tolerance of machining allowance, helix angle and irregularities in the pre-machining operation.

Figure 4:
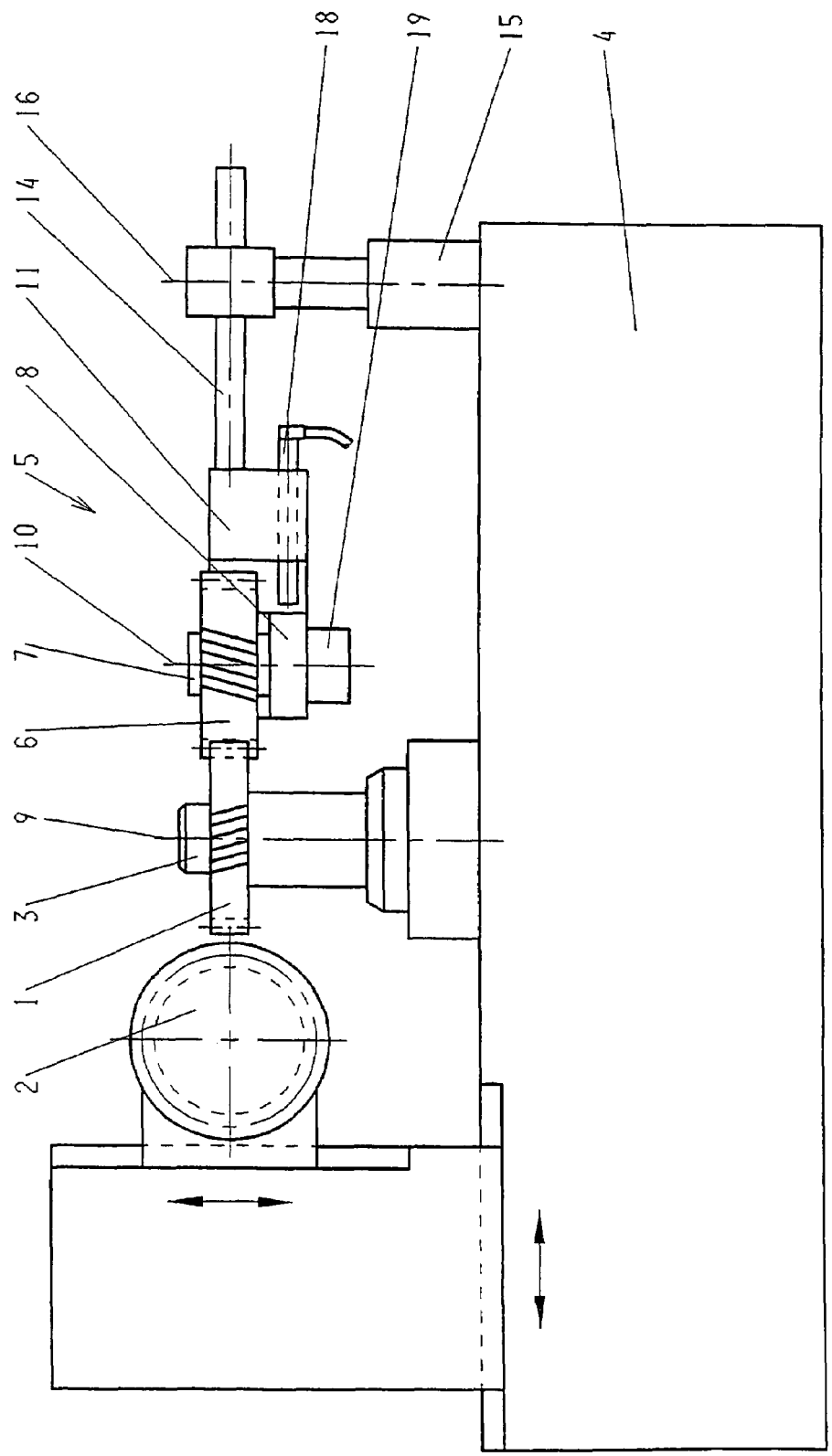
FIG. 4 The machine represented in FIG. 1 in a second form of embodiment.
Figure 5:
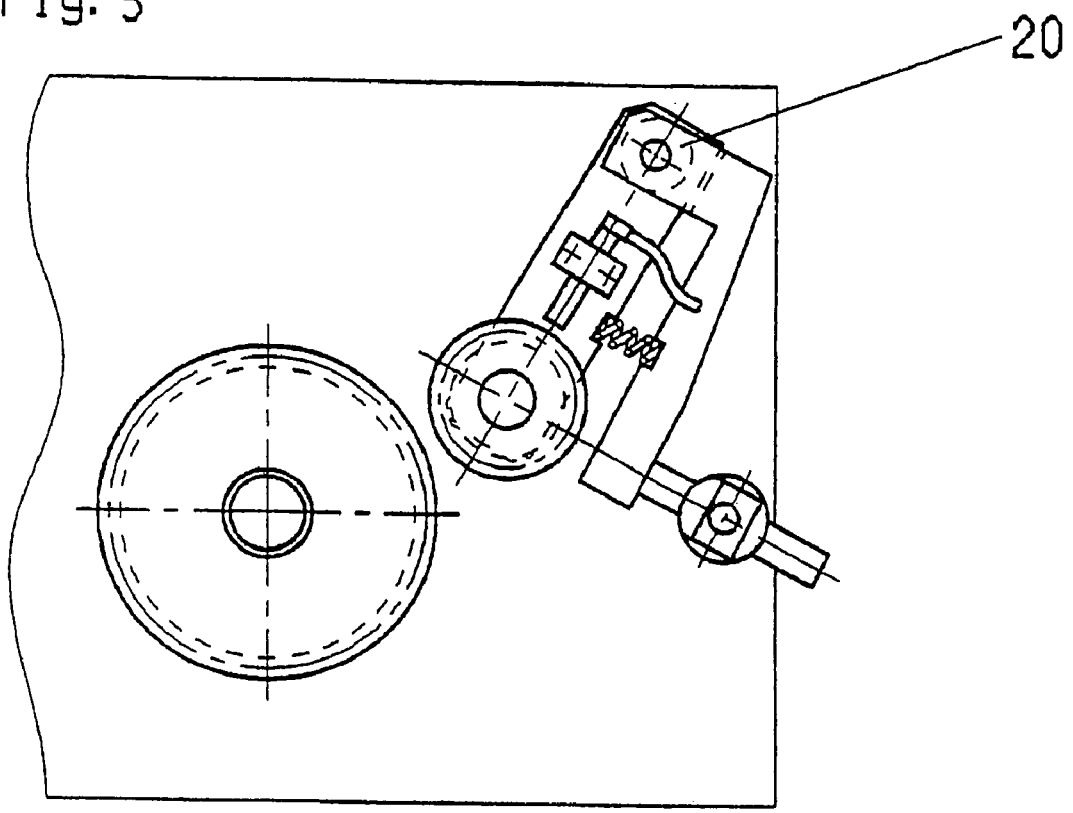
FIG. 5 A partial view of the machine according to the invention in a third form of embodiment.

Instead of the aligning probe 17 for the measurement of the angular position of the tooth space centre lines of the pilot gear 6, a rotary incremental encoder 19 can also be employed, the shaft of which is in positive anti-rotation connection with the pilot gear spindle 7. This is shown in FIG. 4. Likewise, instead of with the measuring probe 18, the centre distance between workpiece 1 and pilot gear 6 can be measured with a rotary incremental encoder 20 in the pivot axis 16, which measures the swivel angle of the pilot gear support 8 relative to the bearer arm 11. This version is shown in FIG. 5. The variants according to FIGS. 4 and 5 can also be combined.

Instead of locating the pilot gear 6 on a swivelling pilot gear support 8, any other device is also feasible which presses the pilot gear—held in a pilot gear support—against the gear teeth to be measured under a pre-selectable force, whereby the pilot gear or the pilot gear support must be kept in absolute no-backlash contact relative to the gear teeth in the peripheral direction.

By means of the preliminary testing of the workpiece prior to the finish machining operation, out-of-tolerance workpiece characteristics pertinent to the process, such as radial run-out, flank material allowance, helix angle, and irregularities in pre-machining can be duly detected, and the relevant workpieces discarded from the manufacturing process. In like manner by repeating the testing procedure after the finish machining of the workpiece 1, any chance profile deviations of the finish machined tooth flanks, such as incurred for example by a damaged machining tool 2, can be detected. By means of the device according to the invention therefore, the process reliability is increased, which results in a reduction of the manufacturing costs.

LIST OF REFERENCE NUMBERS

1 Workpiece
2 Machining tool
3 Work spindle
4 Machine bed
5 Aligning and testing device
6 Pilot gear
7 Pilot gear spindle
8 Pilot gear support
9 Work spindle axis
10 Pilot gear axis
11 Bearer arm
12 Pilot gear support axis
13 Compression spring
14 Clamping shaft
15 Pivot spindle
16 Pivot axis
17 Aligning probe
18 Measuring probe
19 Rotary incremental encoder
20 Rotary incremental encoder

The invention claimed is:

1. Process for aligning tooth spaces of a pre-machined workpiece with precut teeth, comprising:
fixing the pre-machined workpiece on a work spindle of a gear finishing machine,
bringing the pre-machined workpiece into a no-backlash double flank mesh with a pilot gear, wherein the no-backlash double flank mesh is on the finishing machine
rotating the pre-machined workpiece,
during this rotation measuring (1) an angular position of tooth space centre lines of the pilot gear and (2) a centre distance between the pilot gear and the workpiece to align the tooth space of the pre-machined workpiece, and
fine machining the teeth of the pre-machined workpiece on the work spindle.

2. Process according to claim 1, wherein the aligned pre-machined workpiece has a first module and a first tooth helix angle,
wherein a pilot gear employed has a second module and a second tooth helix angle, and
wherein the first and second module and the first and second tooth helix angle coincide in magnitude and the two tooth helix angles have opposite algebraic signs.

3. Process according to claim 1, further comprising moving the pilot gear towards the workpiece.

4. Process according to claim 1, wherein the workpiece is actively rotated and the pilot gear is passively rotated.

* * * * *